United States Patent [19]

Gintz

[11] 3,912,685

[45] Oct. 14, 1975

[54] POLYMER COMPOSITION

[75] Inventor: Francis Paul Gintz, London, England

[73] Assignee: BP Chemicals International Limited, England

[22] Filed: July 30, 1973

[21] Appl. No.: 383,963

[30] Foreign Application Priority Data

Aug. 10, 1972 United Kingdom............... 37403/72

[52] U.S. Cl. ......... 260/42.37; 260/23.3; 260/42.18; 260/42.32; 260/42.44; 260/42.54; 260/845; 260/889; 260/890; 260/892

[51] Int. Cl.²......................................... C08K 3/34

[58] Field of Search............. 260/889, 41.5 A, 42.37

[56] References Cited

UNITED STATES PATENTS

| | | | |
|---|---|---|---|
| 2,912,410 | 11/1959 | Cole.................................... | 260/889 |
| 3,794,638 | 2/1974 | Westermann....................... | 260/889 |

*Primary Examiner*—Murray Tillman
*Assistant Examiner*—J. Ziegler

[57] ABSTRACT

Thermosetting moulding compositions comprising high vinyl butadiene polymer, a free radical initiator and, as a shrink controller, atactic polypropylene.

5 Claims, No Drawings

POLYMER COMPOSITION

The present invention relates to thermosetting moulding compositions based on high vinyl butadiene polymer.

Conventional polymers of 1,3-butadiene, for example those produced by free radical aqueous emulsion processes, contain chains of polymerised butadiene units, each unit being chemically bonded to adjacent units in the chain in either the 1 and 2 positions as shown in (a) or the 1 and 4 positions as shown in (b)

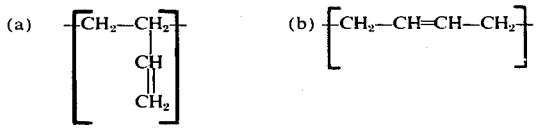

Generally, free radical emulsion polymerisation tends to give butadiene polymer containing mainly the 1,4-bonded units and relatively few 1,2-bonded units. Butadiene polymers and copolymers containing more than about 25% of the 1,2-bonded units are defined in this specification as high vinyl butadiene polymers and can be made for example by alkali metal catalysed polymerisation. High vinyl butadiene polymers are known to have useful thermosetting properties.

By a thermosetting moulding composition is meant throughout this specification a composition which can be fabricated into hard, infusible shaped articles by the action of heat and pressure, for example by subjecting the composition to pressure in a heated mould. Examples of such thermosetting moulding compositions are filled or unfilled compositions, reinforced compositions, preimpregnated mats or other forms of reinforcement in preimpregnated form and preformed moulding compositions.

Among the fillers that can be used are inorganic fillers for example various types of carbon black, silicas, aluminas, and calcium silicate, titanium dioxide, zinc sulphide, calcium carbonate, zinc oxide, magnesia, clays and pulverised fuel ash and organic fillers for example coumarone-indene resins, petroleum resins, high styrene resins such as high styrene — low butadiene copolymers, lignins, wood flour, styrene-isobutylene resins and phenolic resins.

Suitable reinforcing materials are for example glass and asbestos fibres, woven or non-woven mats and chopped strands.

A problem encountered in the thermosetting of butadiene polymers even when the polymers contain filler, is that of shrinkage, such shrinkage being particularly undesirable in many moulding applications.

An object of the present invention is to provide thermosetting moulding compositions having improved properties. A further object of the invention is to provide thermosetting moulding compositions having reduced shrinkage properties.

Accordingly the present invention is a thermosetting moulding composition comprising a polymerisable component comprising a high vinyl butadiene polymer and a free radical initiator and, as a shrink controller, atactic polypropylene.

The high vinyl butadiene used in the composition of the present invention preferably contains at least 30% of 1,2-bonded units and most preferably at least 65% of 1,2-bonded units. Particularly useful thermosetting moulding compositions can be made using high vinyl butadiene polymer containing about 85% of 1,2-bonded units. Suitably the viscosity average molecular weight of the polymer is in the range 500–500,000 and preferably in the range of 1,000–200,000 where the viscosity is measured in an Ostwald viscometer using toluene as solvent at 25°C and the viscosity average molecular weight is calculated from the intrinsic viscosity ($\eta$) using the equation $(\eta) = 1.69 \times 10^{-4} M\bar{v}^{0.73}$.

The polymerisable component may contain a monomer or monomers capable of copolymerising with the high vinyl butadiene polymer for example styrene, vinyl toluene, diethyl fumarate, diethyl maleate, dibutyl fumarate, acrylamide, methacrylamide, N,N$^1$-methylene bis-acrylamide, ethylene glycol dimethacrylate, allyl methacrylate, and trimethylol propane trimethacrylate.

Suitably the polymerisable components can contain up to 50% of the copolymerisable monomer based on the weight of high vinyl butadiene polymer. A thermosetting moulding composition comprising a high vinyl butadiene polymer, a free radical initiator and an acrylamide compound having the general formula $H_2C:CRCONHR^1$ wherein R is hydrogen or an organic hydrocarbon substituent and $R^1$ is hydrogen or an organic substituent is described in our British patent application No. 36295/70 filed July 27, 1970, referred to in the application documents as Case CPE 2894 and entitled "Polymer Composition," which corresponds to Ser. No. 164,421, filed July 20, 1971, U.S. Pat. No. 3,793,260.

The initiator is suitably an organic peroxide compound, examples of such compounds being ditertiary butyl peroxide, tertiary butyl perbenzoate, tertiary butyl peroctoate, benzoyl peroxide, 1,1-ditertiary butyl peroxy 3,3,5-trimethylcyclohexane and tertiary butyl peracetate. Useful thermosetting moulding compositions are obtained using bis (alkyl peroxy) mononuclear aromatic compounds as initiators, for example, 1,3- or 1,4-bis (tertiary butyl peroxy isopropyl) benzene. A thermosetting moulding composition comprising a high vinyl butadiene polymer and a free radical initiator comprising a bis (alkyl peroxy) mononuclear aromatic compound is described in our British patent application No. 36294/70 filed July 27, 1970, referred to in the application documents as Case CPE 2931 and entitled Polymer Composition, which corresponds to Ser. No. 164,422, filed July 20, 1971, U.S. Pat. No. 3,794,638.

Mixtures of initiators can be used if desired.

Suitable concentrations of initiator used in the thermosetting moulding composition are in the range 1 to 10% based on the weight of high vinyl butadiene polymer.

The atactic polypropylene shrink controller used in the compositions of the present invention suitably has a number average molecular weight in the range 250 to 200,000 and preferably in the range 500 to 20,000.

If desired, additional materials capable of controlling shrinkage can be incorporated in the thermosetting moulding compositions of the present invention for example polystyrene, poly-N-phenylacrylamide; low, medium or high density polyethylene or mixtures thereof; chlorinated polyethylene; polymeric materials such as rubbery or liquid isobutene polymers; and saturated liquid polymers such as polypropylene adipate, polypropylene sebacate and polypropylene glycol. A thermosetting moulding composition comprising a polymerisable component comprising a high vinyl butadiene polymer and a free radical initiator and, as a shrink controller, polyethylene comprising an ethylene homopolymer or an ethylene copolymer containing at least 85% of copolymerised ethylene units is described in our British patent application No. 36296/70 filed July 27, 1970, referred to in the application documents as Case CPE 2893 and entitled Polymer Composition, which corresponds to Ser. No. 300,744, filed Oct. 25, 1972, U.S. Pat. No. 3,821,158.

When it is desired to incorporate polystyrene into the composition of the present invention, preferably monomeric styrene is also incorporated at a concentration in the range of 100 to 200% based on the weight of polystyrene. The various components of the thermosetting moulding composition of the present invention can be mixed together in any order, conventional mixing apparatus being employed if desired. If desired, a diluent for example hexane or toluene can be used to facilitate the mixing of the components and all, or the bulk of the diluent can then be removed under vacuum or by heating to a temperature below about 100°C preferably under vacuum or in a stream of nitrogen. Heating the composition to temperatures not greater than about 100°C can also be used to promote better mixing of the components.

When glass fibre is used as reinforcement in the compositions of the present invention it is preferred to use at least some diluent to facilitate the mixing and minimise mechanical damage to the fibre.

Where fillers such as glass fibre, silica, quartz, clay or pulverised fuel ash are incorporated into the thermosetting moulding compositions of the present invention, adhesion promoting silanes for example vinyl-tris (beta-methoxy ethoxy) silane can if desired be included to improve the adhesion between the filler and the thermoset components in the thermoset products.

Anti-oxidants for example butylated hydroxy toluene (BHT) can be incorporated in the thermosetting moulding compositions of the present invention to prolong their shelf life.

The thermosetting of the moulding compositions is suitably carried out at temperatures in the range 140°–250°C and at a pressure in excess of 100 lb. per square inch.

The thermosetting moulding compositions of the present invention have improved flow properties. They show less shrinkage on thermosetting than similar compounds wherein no atactic polypropylene shrink control is used. They have good tensile strength in the thermoset state. They are useful for making, for example, articles such as pump impellors and moulding for electrical applications.

The following Examples illustrate the preparation and properties of thermosetting moulding compounds, Examples 2 and 4 being according to the present invention and Examples 1 and 3 are by way of comparison.

EXAMPLE 1

A thermosetting moulding composition was prepared by mixing together the following ingredients at 85°C.

| | |
|---|---|
| High vinyl butadiene polymer with $M\bar{v} = 6000$ and containing 85% of 1,2 bonded units | 100 p.b.w. |
| Silica filler | 500 |
| 1,3-bis (t-butylperoxyisopropyl) benzene | 6 |
| Butylated hydroxytoluene | 0.5 |
| α-methacryloxypropyl trimethoxysilane | 2.5 |

Tests specimens were moulding at 180°C for 5 minutes at 2.5 tons/sq. in. to give mouldings which showed severe cracking. Mould shrinkage was 0.011 m/m.

EXAMPLE 2

A thermosetting moulding composition was prepared by mixing together the following ingredients at 85°C.

| | |
|---|---|
| High vinyl polybutadiene with $M\bar{v} = 6000$ and containing 85% of 1,2 bonded units | 80 p.b.w. |
| Atactic polypropylene with $M\bar{n} = 1,200$ | 20 |
| Silica filler | 500 |
| 1,3-bis (t-butylperoxyisopropyl) benzene | 6 |
| Butylated hydroxytoluene | 0.5 |
| α-methacryloxypropyltrimethoxysilane | 2.5 |

Test specimens were moulded at 180°C for 5 minutes at 2.5 tons/sq. in. to give mouldings which showed good flow and which were free of cracks and warping. Mould shrinkage was 0.0084 m/m.

EXAMPLE 3

A thermosetting moulding composition was prepared by mixing together the following ingredients, the mixture being maintained at 85°C.

| | |
|---|---|
| High vinyl butadiene polymer with $M\bar{v} = 6000$ and containing 85% of 1,2-bonded units | 100 p.b.w. |
| Calcium carbonate filler | 300 p.b.w. |
| 1,3-bis (t-butylperoxyisopropyl) benzene | 2.6 |
| 1,1-di-t-butylperoxy 3,3,5-trimethyl-cyclohexane | 2.6 |
| Trimethylol propane trimethacrylate | 5 |
| ¼" Glass fibre | 80 |

Test specimens were moulded at 180°C for 5 minutes at 2.5 tons/sq in. to give mouldings which showed hairline cracks. Mould shrinkage was 0.0063 m/m. Appreciable resin separation was apparent.

EXAMPLE 4

A thermosetting moulding composition was prepared by mixing together the following ingredients at 85°C.

| | |
|---|---|
| High vinyl butadiene polymer with $M\bar{v} = 6000$ and containing 85% of 1,2 bonded units | 80 p.b.w. |
| Atactic polypropylene with $M\bar{n} = 1,200$ | 20 |
| Calcium carbonate filler | 300 |
| 1,3-bis (t-butylperoxyisopropyl) benzene | 2.6 |
| 1,1-di-t-butylperoxy 3,3,5-trimethyl-cyclohexane | 2.6 |
| Trimethylol propane trimethacrylate | 5 |
| ¼" Glass fibre | 80 |

Test specimens were moulded at 180°C for 5 minutes at 2.5 tons/sq in to give mouldings which were free of cracks and warping. Resin separation was minimal and mould shrinkage was 0.0029 m/m.

I claim:

1. In a thermosetting moulding composition comprising (a) as its major polymerizable component (i) a high vinyl butadiene polymer containing at least 65% of 1,2- bonded units, and (ii) from 1 to 10%, based on the weight of said polymer, of an organic peroxide free radical initiator and (b) a filler as its major nonpolymerizable component, the improvement consisting of the presence of a shrink controlling amount of atactic polypropylene having a number average molecular weight in the range of 250 to 200,000, as a shrink controller.

2. The improved thermosetting moulding composition according to claim 1 wherein the initiator is 1,3 or 1,4 bis (tertiary butyl peroxy isopropyl) benzene.

3. The improved thermosetting moulding composition according to claim 1 wherein the number average molecular weight of the atactic polypropylene is in the range 500 to 20,000.

4. The improved thermosetting moulding composition according to claim 1 wherein silica is a filler.

5. The improved thermosetting moulding composition according to claim 1 wherein the high vinyl butadiene polymer contains about 85% 1,2-bonded units.

* * * * *